March 22, 1955 P. A. BANCEL 2,704,631
CONTROLLING DEVICE FOR COMPRESSORS
Filed Jan. 22, 1951 2 Sheets-Sheet 1

INVENTOR
PAUL A. BANCEL
BY
HIS ATTORNEY.

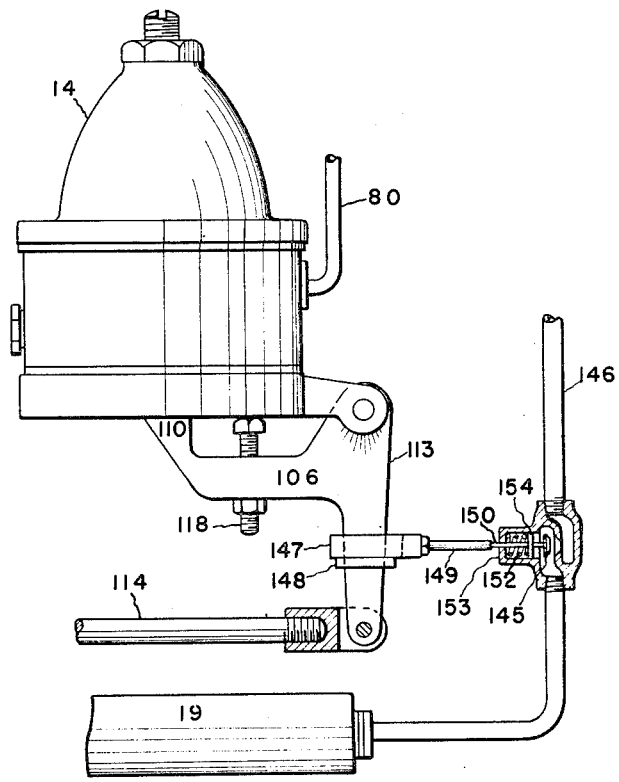

United States Patent Office 2,704,631
Patented Mar. 22, 1955

2,704,631

CONTROLLING DEVICE FOR COMPRESSORS

Paul A. Bancel, Montclair, N. J., assignor to Ingersoll-Rand Company, New York, N. Y., a corporation of New Jersey Application January 22, 1951, Serial No. 207,171

10 Claims. (Cl. 230—3)

This invention relates to speed control devices and more particularly to a speed control device for a motor-compressor unit for compressing a gas.

It is common knowledge that one of the factors limiting the speed at which a motor may operate for any given period of time is the maximum allowable temperature at which the motor can operate without causing damage to the motor or otherwise materially shortening the operating life thereof. In other words, the rated capacity of the motor is determined, in a great part, by the maximum allowable operating temperature of the motor; and, accordingly, in order to avoid overheating of the motor due to overspeeding, it is usual to provide the motor with some type of governor or stop for limiting the speed of the motor to its rated capacity.

There are, however, installations wherein the load on the motor varies or is intermittent, which means, of course, there are periods during which the motor operates at a speed or capacity below that of its rating. During these periods, the motor temperature will fall to something below the maximum allowable temperature. Following these periods of low speed or idling it is permissible to operate the motor for a short period at a speed in excess of its normal rated speed without exposing the working parts of the motor to the danger of damage resulting from excessive temperatures of these parts. The length of time which the motor can operate at this excess speed, without causing undue damage to the motor, is determined, in part, by the length of the idling period preceding the period of overspeed.

It is accordingly one object of this invention to provide a speed control device which will permit the motor to operate at a speed in excess of its normal rated speed in response to a sustained load demand above some predetermined value, whenever this load demand is preceded by a period of normal or low demand on the motor.

Another object of this invention is to provide a speed control device to control the length of time of the overspeed period in accordance with the length of time of the period of relatively low speed preceding the overspeed period.

Still another object of this invention is to accumulate energy during periods of relatively low load demand on the motor and to utilize this accumulated energy to actuate a means for permitting an overspeed period following the accumulating period.

A further object is to provide an overspeed device which is readily adaptable to existing speed regulation mechanisms for motor-compressor units.

Figure 1:
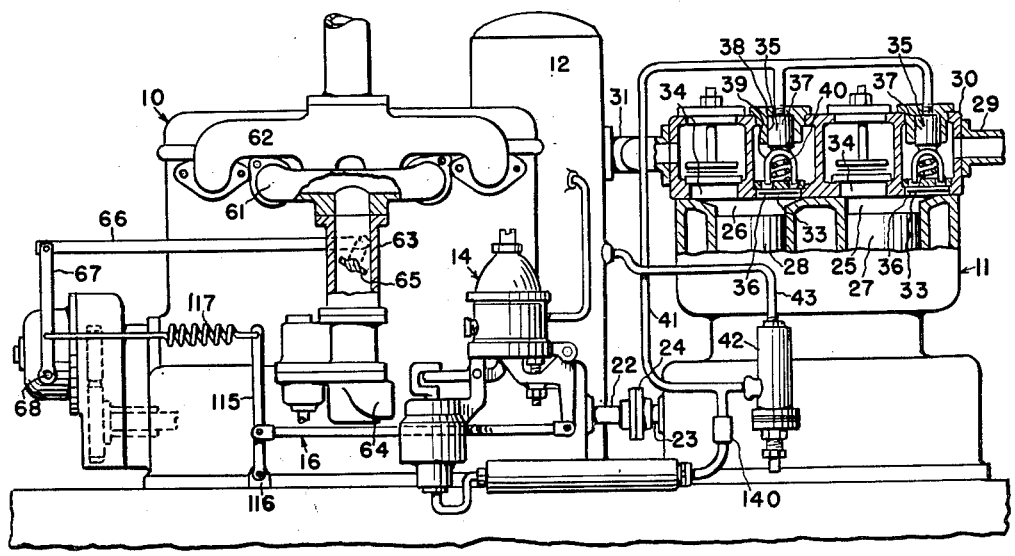

Other objects will become apparent from the specification and accompanying drawings in which, Figure 1 is a side elevation, partly broken away, of a motor-compressor unit equipped with a speed control device constructed in accordance with the practice of the invention.

Figure 3:
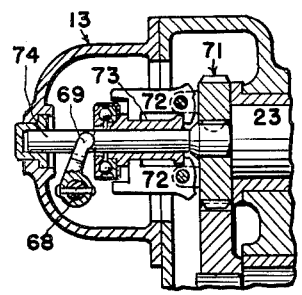
Figure 2:
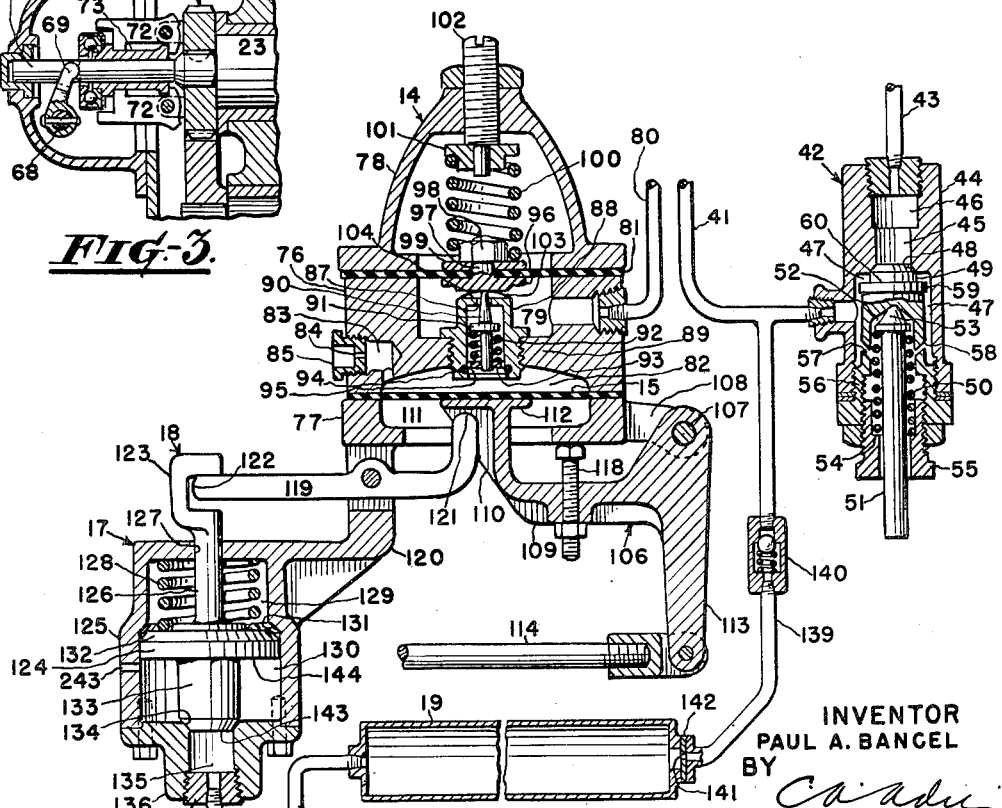

Fig. 2 is a vertical section of the speed regulator and associated overspeed control for the motor, Fig. 3 is a sectional view of the speed governor, Fig. 4 shows a modified form of the invention adapted to a motor-compressor unit, Fig. 5 is an enlarged view of the modification shown in Fig. 4, and Fig. 6 is a detail of Fig. 5.

The motor-compressor unit illustrated in Figure 1 is a conventional unit and includes an internal combustion engine 10 for driving a gas compressor 11 connected to a receiver 12 for storing compressed gas discharged from the compressor.

The unit is equipped with a preferred form of the speed control device which comprises, in general, a speed governor 13 (best seen in Figure 3) mounted on the drive shaft of the motor 10 for maintaining the speed thereof at a relatively constant value by controlling the flow of fuel to the motor intake. This speed value is, however, varied over a predetermined speed range by a regulator 14 acting in response to variations in load demand on the motor 10. In furtherance to this end, the regulator 14 is provided with a reciprocating member 15 here shown as a diaphragm, exposed to and actuated by pressure fluid discharge from the compressor 11. Movement of the member 15 in response to variations in the discharge pressure is transmitted by linkage 16 through the governor 13 to vary the speed of the motor.

With this arrangement then, if there is a change in demand on the compressor 11, the accompanying variation in pressure within the receiver 12 causes the member 15 to change the speed of the motor 10 so as to vary the output of the compressor 11 to meet the load demand thereon. It is also to be noted that the governor 13 acts throughout the entire speed range of the motor 10 to maintain the speed thereof relatively constant at the value determined by the regulator 14.

In order to prevent overspeeding of the motor 10 in the event of a sustained high load which results in a continued decrease in receiver pressure and, in response thereto, a continued increase in speed of the motor 10, a stop mechanism 17 is provided to limit the movement of the member 15 in one direction, and accordingly limit the maximum speed of the motor 10. This speed limit is increased, however, under certain circumstances through the provision of means for permitting an increased range of movement, for a limited period of time, of the member 15 in response to a sustained load demand above a predetermined value provided this load demand is preceded by a period of relatively low load demand on the compressor 11.

More particularly this means includes a stop 18 which in its normal, or usual, position limits the movement of the member 15 to prevent the regulator 14 from increasing the speed of the motor 10 above the rated speed thereof. Operating in connection with the stop 18 is an energy accumulator 19 which is adapted to accumulate energy from the motor-compressor unit and means, including the conduit 139 and valve 42 or conduit 146 and valve 145, for supplying energy to the accumulator whenever the demand on the unit is below some predetermined value. The energy thus accumulated acts in co-operation with the regulator 14 at some predetermined sustained load demand on the unit to actuate said stop into its overspeed position for increasing the speed range of the motor—i. e., the permitted range of movement of the member 15 is increased, thus increasing the range over which the regulator acts to vary the speed value which is maintained relatively constant at any regulator setting by the governor 13.

The length of time, or period, of overspeed is, of course, limited in order to prevent damage to the motor due to excessive temperatures, and in furtherance to this end means are provided for dissipating the accumulated energy whenever the motor is running above its rated speed. Thus, when this energy is dissipated the stop 18 is returned to the first said or normal position to reduce the speed of the motor 10 to its rated value. It is to be noted in this connection, that in the event that the load demand on the compressor 11 falls below the aforesaid upper predetermined value and the pressure within the receiver rises before all of the accumulated energy is dissipated, the stop 18 will be returned into its normal position and the remaining accumulated energy is saved for use in the event of a future high load demand. In other words, whenever the load demand is such that the entire overspeed period available (say 5 minutes) is not utilized before the receiver pressure is returned to its normal value (assume 3 minutes of the period was utilized), that portion of the period not utilized (2 minutes) remains available to permit a second overspeed period of that duration (2 minutes) without an intervening period of relatively low load demand. The structure whereby this operation is obtained will be explained in detail hereinafter.

Referring in greater detail to the construction of the unit and the associated control device, 10 designates the internal combustion engine and 11 the compressor of the unit having their respective shafts 22 and 23 connected together by a coupling 24.

The compressor 11 is shown as being of the multistage vertical type having a first stage cylinder 25 and a second stage cylinder 26 and pistons 27 and 28, respectively, therein for compressing the fluid medium which is delivered to the compressor by an inlet conduit 29 connected to a head 30 for the cylinders. The discharge output of the compressor passes from the head 30 through a conduit 31 connected to the storage receiver 12.

The admission of fluid into the cylinders 25 and 26 is controlled by suitable inlet valve mechanisms 33 arranged in the head 30. The head also contains discharge valve mechanisms 34 for controlling the discharge of compressed fluid from the cylinders into the head, and the head 30 may be provided with a suitable passage (not shown) to convey the fluid from the discharge valve of the low pressure cylinder to the inlet valve of the high pressure cylinder.

The load on the cylinders 25 and 26 is controlled by unloading devices 35 that operate to unseat the valve elements 36 of the valve mechanisms 33. In the form shown each unloading device 35 comprises a piston 37 which is reciprocable in a chamber 38 in the upper wall of the head 30 and having depending fingers 39 on the piston for engagement with the valve element 36. A spring 40 interposed between the valve mechanism 33 and the piston 37 normally holds the piston 37 in a retracted position and the fingers 39 out of the engagement with the valve element 36.

The pistons 37 are actuated for unseating the valve elements 36 by pressure fluid which is conveyed to the chambers 38 by a conduit 41 leading from an auxiliary valve mechanism 42 to which pressure fluid is conveyed from the receiver 12 by a conduit 43. The valve mechanism 42 comprises a casing 44 having an axial bore 45 the upper portion of which is in constant communication with the conduit 43 and constitutes a pressure chamber 46. The chamber 46 opens at its lower end into a valve chamber 47, and at the juncture of the chambers is a beveled seat 48 for a valve 49 reciprocable in the chamber 47.

The valve 49 is normally held against the seat 48 by a spring 50 encircling a guide rod 51 that extends into a recess 52 in the lower portion of the valve and has a coniform head 53 for point-engagement with the valve. The upper end of the spring 50 seats against the coniform head 53 and the lower end against a shoulder 54 within a sleeve 55 which loosely encircles the guide rod 51 and is threaded into the lower end portion of the casing 44 for varying the force of the spring 50. More particularly, the sleeve 55 is in threaded engagement with a bushing 56 which is itself threaded into the casing 44 for adjustment endwise thereof and is provided at its upper end with a beveled seat 57 for a correspondingly beveled seating surface 58 at the lower end of the valve 49.

The valve 49 is guided only by the guide rod 51 and is of smaller diameter than the chamber 47 to define a pathway for the passage of pressure fluid to the conduit 41 which opens into the valve chamber 47 at a point between the seats 48 and 57. Near the upper portion of the valve is an external flange 59 which is of slightly smaller diameter than the chamber 47 to partly restrict the flow of the pressure fluid passing to the conduit 41, and the upper surface of said flange 59 constitutes a pressure surface 60 against which the fluid impinges at the instant communication is established between the chambers 46 and 47 to cause the valve to quickly snap downwardly against the seat 57 and thereby prevent the loss of pressure fluid through the bushing 56 and the sleeve 55 to the atmosphere.

In practice, the upper end of the valve 49 is constantly subjected to the force of the pressure in the chamber 46 and the spring 50 is adjusted to yield to a certain predetermined maximum receiver pressure. Thus, when the pressure fluid in the chamber 46 reaches that value it will unseat the valve 49 and, striking against the flange 59, will cause the valve 49 to be quickly moved downwardly against the seat 57 and to be held in that position by the pressure of the fluid acting against the upper end of the valve and the pressure surface 60. Pressure fluid will then flow from the valve chamber 47 through the conduit 41 into the chambers 38 against the piston 37 and cause the fingers 39 to unseat the valve elements 36.

In this way, the compressor cylinders will be unloaded and will remain thus until the receiver pressure falls to the aforesaid predetermined value whereupon the spring 50 will act to shift the valve 49 against the seat 48 and cut-off the communication between the storage receiver and the conduit 41. The pressure fluid will then exhaust from the chambers 38 through the conduit 41 into the chamber 47, thence through the space between the seat 57 and the seating surface 58 and through the bushing 56 and the sleeve 55 to the atmosphere. At the same time the springs 40 will move the fingers 39 out of engagement with the valve elements 36 which will then again function in the normal manner to control fluid admission into the compressor cylinders.

The internal combustion engine 10 driving the compressor may be of a conventional type, having the usual inlet and exhaust manifolds 61 and 62, an inlet conduit 63 connecting a carburetor 64 to the inlet manifold and a butterfly valve 65 in the conduit 63 for controlling the fuel supply to the engine. Movement is transmitted to the valve 65 for setting it in its different fuel controlling positions by a rod 66 which is pivotally connected at one end to the valve 65 and at its other end, in like manner, to a lever 67 affixed to the shaft 68 of a rocker arm 69 which is actuated by the speed governor 13 of the engine 10. The governor 13, which is shown positioned at an end of the engine to be driven by its crankshaft through a suitable gear train 71, is of the well known type having centrifugally actuated arms 72 pivotally connected to the driven gear of the train 71 to act against a sleeve 73 slidable upon a shaft 74 on the driven gear for actuating the rocker arm 69. These parts, so arranged, will operate to rotate the butterfly valve 65 for diminishing the flow of fuel to the engine whenever it tends to overspeed; and whenever the speed of the engine tends to fall, as will occur whenever the motor is loaded, the governor moves to permit the linkage 16 to reverse the movement of the valve and thereby increase the flow of fuel to the engine, thus the speed of the motor is maintained at a relatively constant value.

Although the governor acts to maintain the speed of the motor at a relative constant value, this speed value is varied over a predetermined range by a mechanism, acting responsively to variations in discharge pressure of the compressor and connected to the said governor 13 through the linkage 16. This mechanism, in a preferred form, comprises the regulator 14 the casing of which consists of an intermediate body 76, a plate-like cover 77 at one end of the body and a dome-shaped cover 78 at the opposite end. The body 76 is recessed in the side confronting the cover 78 to provide a chamber 79 which is in constant communication with the receiver 12 through a conduit 80, and its outer end is sealed by a diaphragm 81 that is clamped at its marginal portion between the body 76 and the cover 78.

The opposite end of the body 76 is likewise recessed to provide a chamber 82 which is in constant communication with the atmosphere through a passage 83 in the body 76 and an orifice 84 in a plug 85 threadedly connected to the body. The outer end of the chamber 82 is sealed by the reciprocating member, or a diaphragm 86, clamped between the body and the cover 77, and pressure fluid for actuating the diaphragm 15 passes to the chamber 82 from the chamber 79 through an orifice 87 in the end of a cup-shaped member 88 threaded, in inverted position, into the wall 89 separating the chambers 79 and 82 from each other.

The flow path area of the orifice 87 is determined by a metering pin 90 in the member 88 and movable axially thereof. The pin 90 extends into the orifice 87 and is of coniform shape so that when it rises within the member 88 said pin decreases the flow area of the orifice and increases the area of communication between the chambers 79—82 when moving in the opposite direction.

The pin 90 has a shoulder 91 at the large end of its coniform portion to serve as a seat for a spring 92 which rest sat its other end on a spring seat 93 in the lower end of the member 88 and tends constantly to urge the pin 90 upwardly for closing the orifice 87. The spring seat 93 is retained within the member 88 by a retaining ring 94 seated in the lower end of the member 88 and has suitable perforations 95 for the passage of pressure fluid from the member 88 into the chamber 82.

The spring 92 is capable of exerting a force sufficient to retain the pin 90 in position to close the orifice 87 against the pressure in the chamber 79, and the downward or opening movement of the pin 90 is effected by the diaphragm 81 which has attached to its underside a plate 96 to overlie and engage the end of the pin 90. The plate 96 has a stem 97 extending through the diaphragm, and a nut 98 threaded onto the stem 97 serves to clamp the diaphragm 81 between the plate 96 and a washer 99 interposed between the nut 98 and the diaphragm. The washer 99 also serves as a seat for an end of a spring 100 the opposite end of which bears against a plate 101 on the lower end of a screw 102 threaded through the outer end wall of the dome-shaped cover 78 for selectively varying the force of the spring 100.

In the relaxed position of the diaphragm 81, as when the pressure within the chamber 79 is of insufficient value to raise the diaphragm against the force exerted by the spring 100, the plate 96 rests upon the end of the member 88. In order, therefore, to prevent said plate from blocking off the orifice 87 the outer end surface 103 of the member 88 is rounded and a radial groove, or grooves, 104 is formed in the end of the member 88 to afford constant communication between the chamber 79 and the orifice 87 to supply pressure fluid to the chamber 82 for actuating the diaphragm 15.

Such movement of the diaphragm serves to normally actuate through the governor 13, the butterfly valve 65 and is transmitted thereto by linkage designated in its entirety by 16 and connected to the lever 67. This linkage comprises a bell crank 106 which is pivoted at its angle on a pin 107 seated in a lug 108 at the side of the cover 77. One arm 109 of the bell crank extends part-way along the cover 77 and has an upwardly directed portion 110 that extends into a recess 111 in the cover 77 and terminates in a plate portion 112 that bears against the underside of the diaphragm 15.

The outer arm 113 of the bell crank 106 is pivotally connected at its free end to a transmission member, or rod, 114 that is, in turn, pivotally connected to an intermediate portion of a rocker 115 pivoted at its lower end in a lug 116 adjacent the base of the engine 10, the upper end of the rocker 115 being connected to an intermediate portion of the lever 67 by a helical tension spring 117. Owing to this arrangement, whenever the bell crank 106 is rotated in a counterclockwise direction, the rod 114 will move the free end of the rocker 115 to the right, as viewed in Figure 1, and this movement is transmitted through the spring 117 to rock the lever 67 and thus move the valve 65 to increase the speed of the motor 10, and simultaneously the force of the spring 117 serves also to resist the centrifugal force tending to move the arms 72 of the speed governor 13.

Suitable stop means are provided to limit the degree of movement and the bell crank 106 and thereby determine the limiting positions of the valve 65. To this end a bolt 118 is threaded into the arm 109 to abut the underside of the cover 77 and is readily adjustable in the arm 109 to vary the upper limiting position, or to limit the degree of clockwise rotation (as viewed in Figure 2) of the crank 106. In the present instance the bolt 118 is so adjusted that when it engages the cover 77 the valve 65 will occupy a position to cause the engine 10 to operate at a predetermined intermediate or idling rate of speed.

Movement of the crank 106 in the opposite, or counterclockwise, direction is limited by the stop 18 which comprises an arm, or lever, 119 pivoted on a bracket 120 depending from the cover 77, the inner end portion of the arm 119 being turned upwardly in perpendicular relation to the plate portion 112 and terminating at 121 adjacent the under surface thereof. Normally the end 121 is so positioned that whenever the plate 112 comes into contact therewith, movement of the crank 106 is halted at a point whereat the motor 10 is operated at its rated speed; and in furtherance of this end the opposite end 122 of the arm 119 lies within a hook 123 which is secured to the upper end of a piston 124 slidable within a housing 125 integral with the bracket 120. The shank, or straight portion, 126 of the hook 123 extends slidably through an opening 127 in the upper end of the housing 125 and encircling the portion of the shank 126 within the housing 125 is a spring 128 biased between the upper end of the piston 124 and the opposed end of the chamber 129 within the housing 125.

The upper portion of the chamber 129 is of somewhat smaller diameter than the lower portion 130 of the chamber in which the piston 124 reciprocates, and at the juncture of these two portions is a tapered surface 131 which co-operates with a complimentary surface 132 on the piston 124 to provide a seat therefor and to limit the movement of the piston 124 in the upward direction.

Depending from the lower end of the piston 124 and integral therewith is an extension, or second piston, 133 of somewhat smaller diameter than the piston 124. Whenever the piston 124 is actuated off its seat 131 into its lower limiting, or normal position, the free end of the piston 133 bears against a seat 134 encircling a central bore 135 in a cover 136 secured to the lower end of the housing 125 and enclosing the end of the chamber portion 130. Threaded in the opposite end of the bore 135 is a plug 137 to which is connected a conduit 138 the opposite end of which is secured to the outlet end of the pressure accumulator 19 thereby communicating the bore 135 with the accumulator 19. The inlet end of the accumulator, shown as a cylindrical tank, 19 is connected to a branch conduit 139 of the conduit 41 and is thereby communicated with the receiver 12 whenever the valve 49 is held on its seat 57, or, in other words, the tank 19 is charged whenever the compressor 11 is unloaded.

In order to prevent exhausting fluid from the tank 19 through the auxiliary valve 42 when the compressor is operating loaded, a check valve 140 is interposed in the branch conduit 139. This valve acts then, to permit pressure fluid to flow to the tank 19 only when the pressure within the tank 19 exceeds some predetermined value and prevents reverse flow through the conduit 139. The rate of flow of pressure fluid into the tank 19 is limited by an orifice 141 in a plate 142 clamped between the downstream end of the conduit 139 and the inlet end of the tank 19. By virtue of this arrangement the amount of pressure fluid accumulated in the tank 19 is determined by the length of the period the compressor operates unloaded or at a relatively low load demand. In other words, the longer the period of low load demand, the more nearly the pressure of the fluid within the tank 19 approaches that existing within the receiver 12.

When the compressor 11 is operating under a normal load demand, the piston 124 assumes the position shown in Figure 2 with the free end of the piston 133 held on its seat 134 by the spring 128 thereby precluding the escape of pressure fluid from the tank 19 into the enlarged portion 130 of the chamber 129. In this position the end 122 of the arm 119 rests against the upper inner surface of the hook 123 and the opposite end 121 of the arm 119 is positioned to limit the counterclockwise movement of the bell crank 106 to a position whereat the valve 65 permits the motor 10 to operate at its rated speed.

If, in this position with the plate portion 112 bearing against the end 121 of the arm 119, the compressor 11 is subjected to an overload, the pressure within the chamber 82 will increase and a force will be exerted on the hook 123 in the upward direction through the arm 119. The strength of the spring 128 is so chosen, however, so that this force is not sufficient to overcome the downward force exerted on the hook 123 by the spring 128 and the motor 10 will continue to operate at its rated speed. However, if this period of high load demand has been preceded by a period of low load demand so that the tank 19 is charged with pressure fluid, the combined forces—fluid pressure acting on the end surface 143 of the piston 133 and the force exerted on the hook 123 by the arm 119—acting in the upward direction will overcome the opposing force exerted by the spring 128 to move the piston 133 off its seat 134 and permit pressure fluid to flow from the tank 19 into the chamber portion 130 wherein this fluid acting against the pressure surface 144 of the piston 124 will snap the piston 124 into its upper limiting position against the seat 131.

The stop 18 in moving to its upper limiting position permits the arm 119 to rotate in the clockwise direction, as viewed in Figure 2, and the end 121 of the arm 119 serving as a stop for the crank 106 accordingly moves in the downward direction under the force of the diaphragm 15 thereby increasing the limit of movement of the crank 106 in the counterclockwise direction. This means, of course, that if the pressure within the chamber 82 continues to rise, the crank 106 will be actuated in the counterclockwise direction to progressively increase the speed of the motor 10 until such time as this movement of the crank 106 is limited by the stop 18 in its new or overspeed position.

In order to limit the overspeed period, in the event the load demand on the compressor 11 does not fall to a value whereat the regulator 14 will act automatically to decrease the speed of the motor 10, means are provided for dissipating energy accumulating in the tank 19. In the form of the invention illustrated, this means is shown as being an orifice 243 in the housing 125, which communicates the chamber portion 130 with the atmosphere. Thus, whenever the piston 133 moves from its seat 134 communication is established between the atmosphere and the tank 19 and accordingly, the pressure in the tank 19 and chamber 129 will fall at a rate determined by the size of the orifice 243 and the pressure differential thereacross. This lowering in pressure results in a reduction of the force holding the stop 18 in its overspeed position thereby permitting the oppositely directed force to return the stop to the rated speed position.

It is to be noted that there are two forces acting to hold the stop 18 in its overspeed position; pressure fluid acting against the surfaces 143 and 144, a continually decreasing force, and the force exerted by the diaphragm is through the lever 119, the value of the latter force depending on compressor load. Assuming that the pressure within the chamber 82 remains constant, the diaphragm 15 will exert a constant force against the lever 119 and hence, a constant force in the upward direction against the hook 123. This upwardly directed force is augmented by the force exerted by pressure fluid acting against the surfaces 143 and 144, and the stop 18 will be held in its upper limiting, or overspeed, position until the pressure within the chamber 130 falls to a value whereat the combined forces acting in the upward direction on the piston 124 fall to a value whereat the force exerted in the opposite direction by the spring 128 moves the stop 18 into its lower limiting, or rated speed, position and accordingly, reduces the range of movement of the diaphragm 15 so that the speed of the motor 10 is reduced to its rated value.

On the other hand, in the event the load demand on the compressor 11 should fall and the receiver pressure increases so that the pressure within the chamber 82 falls in accordance therewith, the stop 18, due to the decrease in force exerted on the hook 123 by the arm 119 will be returned to its lower limiting position before all of the pressure fluid is exhausted from the tank 19. This means that if subsequently the load demand is again increased above some predetermined value, the stop 18 may be actuated to permit another overspeed period without an intervening low demand period during which the tank 19 is recharged. This second overspeed period will, however, be reduced in accordance with the amount of accumulated energy dissipated in the prior overspeed period. In other words, whenever the accumulator 19 is charged, there is available a fixed amount of energy, determined by the length of the charging period, and the amount of the available energy limits the length of the overspeed period to follow.

It is immaterial whether this available period of overspeed is utilized in several short separate periods of overspeed or one continuous period. The energy is available to actuate the stop and permit overspeed of the motor, and it is relatively unimportant how this permissive period of overspeed is utilized, the important thing is that the motor 10 is not operated for too long a period at overspeed and that such period be predetermined by the length of the idling or lowspeed period of the motor 10. In actual practice it has been found that the conventional internal combustion engine can operate at overspeed for a period of 5 to 15 minutes without encountering excessive temperatures provided this period is preceded by a relatively low speed period.

A modified form of the invention is shown in Figure 4. In this form of the invention means are provided for controlling the charging of the tank 19 at any desired speed of the motor 10, and in furtherance to this end, a valve 145 is interposed in a conduit 146 connecting the inlet end of the tank 19 directly with the receiver 12. This valve 145 is in turn connected to the bell crank 106 and is arranged to be actuated thereby whenever the speed of the motor 10 falls below some fixed value.

More specifically a yoke 147 loosely encircles the arm 113 and is slidably supported thereon by a clamp 148 on said arm. The valve 145 is positioned in the conduit 146 so as to lie in a horizontal plane through the yoke 147 and so positioned horizontal movement of the yoke 147 may be readily transmitted to the valve 145 by a rod 149 threaded at one end in the yoke 147 and rotatably connected at the other end to the stem 150 of the valve 145. The position of the yoke 147 relative to the valve 145, it is to be noted, may be adjusted by rotating the rod 149. This means, of course, that the surface 151 on the yoke 147 opposing the left edge, as viewed in Figure 5, of the arm 113, may be adjusted to come into contact with the arm 113 at any desired speed of the motor 10, and whenever the speed of the motor 10 falls below this value, the arm 113 in moving further to the left, will move the yoke 147 in that direction to open the valve 145 and thereby charge the tank 19.

The opening in the yoke 147 is somewhat greater than the width of the arm 113 so that whenever the speed of the motor 10 exceeds said value, the arm 113 will move to the right out of contact with the surface 151 and a spring 152 interposed between the housing 153 for the valve 145 and a shoulder 154 on the stem 150 will move the valve 145 into the closed position to cut off the flow of pressure fluid into the tank 19.

In practice, and at the beginning of the operating period of the compressor 11 against an empty system, the spring 117 will be fully contracted holding the butterfly valve 65 in a position to supply fuel to the engine 10 at a rate required for operating it at a predetermined intermediate rate of speed. The metering pin 90 will then be fully retracted to permit a maximum area of communication between the chambers 79 and 82 through the orifice 87, and the bell crank 106 will then occupy a position wherein the bolt 118 seats against the cover 77, or in other words, the crank 106 will be in its clockwise limiting position, this being the position of the crank 106 that corresponds with the setting of the valve 65 for operating the motor 10 at the predetermined intermediate or idling speed and also to determine the starting speed of the motor 10.

Under these conditions, pressure fluid will flow from the receiver 12 into the chamber 79 and through the orifice 87 into the chamber 82, and initially only a portion of such pressure fluid will escape from the chamber 82 through the orifice 84 to the atmosphere thereby increasing the pressure within the chamber 82. When the pressure in the chamber 82 reaches a value whereat the force exerted by the diaphragm 15 and tending to rotate the crank 106 in the counterclockwise direction exceeds the force of the governor 13 tending to resist such rotation, the diaphragm 15 will rock the bell crank 106 above its pivot 107 to move the plate portion 112 in the direction of the end 121 of the arm 119. This counterclockwise movement of the crank 106 is transmitted to the valve 65 by the linkage 16 for opening said valve 65 to the position required for operating the engine at its rated speed. In the rated speed position of the valve 65 the plate portion 112 rests against the end 121 of the arm 119 and the speed of the motor 10 will be limited to its rated value unless a period of relatively low load demand has preceded the period of high load demand, and during which period of low load demand the accumulator 19 has been charged.

Assuming that the accumulator 19 has not been charged, the unit will continue to operate in the manner disclosed unless the pressure within the receiver 12 and, therefore, in the chamber 79 reaches some predetermined value, say 100 pounds per square inch (p. s. i.), at which pressure the force exerted against the diaphragm 81 will equal the opposing force exerted by the spring 100. If thereafter the pressure in the chamber 79 continues to increase, the diaphragm 81 will rise and the pin 90 will move upwardly under the force of the spring 92 to reduce accordingly the effective flow area through the orifice 87. At the same time the pressure fluid constantly passes from the chamber 82 through the orifice 84 to the atmosphere so that the pressure within the chamber 82 decreases progressively, both by reason of the decreasing flow area through the orifice 87 and the constant bleeding off of pressure fluid to the atmosphere from the chamber 82.

When the pressure in the chamber 82 falls to a value whereat the force exerted on the crank 106 by the governor 13 exceeds that exerted by the diaphragm 15, the spring 117 will gradually contract and rock the bell crank 106 about its pivot 107 in the clockwise direction to cause the crank 106 to follow the upward movement of the diaphragm 15, and also rock the lever 67 to the right and move the valve 65 in the direction to reduce the fuel supply to the engine 10.

If the receiver pressure continues to rise—due, for example, to a sustained low load demand—say to a value of 105 p. s. i., the diaphragm 81 and the pin 90 will rise and reduce the supply of pressure fluid to, and hence the pressure in, the chamber 82. The bell crank 106 will then swing about its pivot in the clockwise direction until the bolt 118 seats against the cover 77, and the movement of the crank 106 in this direction will place the butterfly valve 65 in the position required to cause the engine 10 to operate at the predetermined idling speed, thereby reducing the output of the compressor 11.

In the event that the receiver pressure continues to rise and the force acting on the valve 49 overcomes the oppositely directed force by the spring 50, the valve 49 will be unseated to admit pressure fluid into the chamber 47. The pressure fluid thus admitted acts against the pressure surface 60 to snap the valve 49 downwardly against the seat 57 thereby cutting off communication of the conduit 41 with the atmosphere and establishing communication between the conduits 41 and 43. Thus pressure fluid will flow through the conduit 41 into the chambers 38 and drive the fingers 39 against the valve elements 36 to unseat the inlet valve mechanisms 33, thereby unloading the compressor 11. At the same time pressure fluid will flow from the conduit 41 through the branch conduit 139 to unseat the check valve 140 and charge the tank 19.

The parts controlling the load on the compressor 11 and the speed of the engine 10 will remain in the position described as long as the pressure in the receiver 12 exceeds the force of the spring 50, but when it falls below that value the spring 50 will return the valve 49 to its seat 48 thereby exhausting pressure fluid from the chamber 38 through the valve chamber 47, the space between the lower end of the valve 49 and the seat 57 and thence through the bushing 56 and the sleeve 55 to the atmosphere. This means, of course, that the branch conduit 139 is also now in communication with the atmosphere, but by virtue of the check valve 140 any pressure fluid accumulated in the tank 19 during the unloading period is trapped therein.

If thereafter, the pressure in the receiver 12 falls to a value that permits the diaphragm 81 to descend under the force of the spring 100 into contact with the pin 90 and increase flow area through the orifice 87, pressure fluid will again flow into the chamber 82 and when the pressure therein reaches a value such that the force acting on the diaphragm 15 and through the bell crank 106 will overcome the spring force exerted by the governor 13, it will shift the valve 65 for increasing the engine speed. Assuming the pressure within the receiver 12 continues to decrease, and accordingly the aforesaid direction of movements of the diaphragm 81 and pin 90 are continued, the pressure within the chamber 82 will continue to increase thereby moving the bell crank 106 in a counterclockwise direction until it reaches its lower limiting position at which time the plate 112 is in contact with the end 121 of the arm 119. The motor 10 is now operating at its rated speed.

If the receiving pressure continues to fall, the pressure in the chamber 82 will, accordingly, continue to rise and a force will be exerted on the arm 119 which force tends to move the stop into its overspeed position. Thus when the combined forces, exerted by the lever 119 and pressure fluid acting against the surface 143, tending to move the stop into its overspeed position, exceed the oppositely directed force of the spring 128, the piston 133 will move clear of its seat 134 and pressure fluid escaping from the tank 19 will, acting against the surface 144, snap the stop 18 into the overspeed position. In this stop position, the diaphragm is permitted to increase the speed range of the motor 10 and accordingly, under the pressure existing in the chamber 82, rocks the crank 106 to increase the speed of the motor to a value exceeding its normal rated speed.

The motor 10 will continue to operate at this overspeed until such time as the forces acting to hold the stop 18 in its upward limiting position fall to a value whereat the spring 128 returns the stop 18 to its lower limiting position and thereby moves the crank 106 to reduce the speed of the motor to its rated value. This decrease in force on the stop 18 may result from either the decrease in pressure in the chamber portion 130 due to the bleeding of pressure fluid therefrom to the atmosphere through the orifice 243, or due to a decrease in pressure in the chamber 82 associated with a rise in pressure in the receiver 12, or a combination of both.

It is to be noted in this connection that due to the design of the regulator 14, the pressure in the chamber 82 will, when plotted against a continuously decreasing pressure in the chamber 79, follow a somewhat parabolic curve, or in other words, as the pressure in the chamber 79 continues to decrease, the pressure in the chamber 82 will initially increase until some predetermined value is reached and thereafter this pressure will start to fall. This relationship is noted in that if the pressure within the chamber 82 did not fall as the pressure in the chamber 79 continued to fall, it would be possible for the force exerted on the stop 18 through the lever 119 to exceed the oppositely directed force by the spring 128 even though pressure fluid were completely exhausted from the chamber 130.

In the modified form of the invention, substantially the same operation of all parts of the regulator 14 occur in response to variations in load demand on the compressor 11 with the exception that pressure fluid may be valved into the accumulator 19 whenever the load demand on the compressor falls below some predetermined value and before the compressor is completely unloaded. That is, pressure fluid may be valved into the accumulator 19 at any speed of the motor 10 as may be regulated by adjusting the position of the yoke 147 with respect to the arm 113.

While I have shown and described two specific forms of my invention, it is to be understood that various changes and modifications may be made without departing from the spirit of the invention as set forth in the appended claims.

I claim:

1. A speed control device for a motor and a compressor driven thereby, comprising a speed governor operatively connected to said motor and acting in response to variations in speed thereof for controlling the speed of the motor, a regulator connected to said governor and to the discharge of the compressor and acting responsively to variations in such discharge pressure for controlling the speed of the motor, a stop mechanism operatively associated with the regulator and acting in one position to limit the range of speed control of the regulator to a maximum rated speed of the motor, an accumulator connected to said stop to accumulate fluid compressed by said compressor, a conduit connected to supply such fluid to the accumulator, means for controlling the flow through said conduit and acting whenever the load demand on the compressor falls below a predetermined value to permit the flow of fluid to the accumulator, said stop being actuated into a second position by the regulator and pressure fluid from the accumulator to increase the control limit of the regulator to a value in excess of said maximum rated speed whenever the load demand on the compressor exceeds a predetermined value higher than the first said predetermined value, and means for releasing such accumulated fluid only when the stop is in the second said position.

2. A speed control device for a motor-compressor unit, comprising a speed governor operatively connected to the motor and acting in response to variations in speed thereof for maintaining the speed of the motor at an approximately constant value, a regulator connected to the speed governor and to the discharge of the compressor for varying said value in accordance with variations in pressure of such discharge, a stop mechanism operatively associated with the regulator and acting in one position to limit the action of the regulator to the maximum rated speed of the motor, an energy accumulator connected to said stop, means for supplying energy to said accumulator whenever the load demand on the compressor falls below a predetermined value, such energy from said accumulator acting in co-operation with the regulator to actuate said stop into a second position to increase said limit to a speed in excess of the maximum rated speed of the motor whenever the sustained load demand on the compressor exceeds some predetermined value in excess of the first said load value, and means for releasing the energy from the accumulator only when the stop is in the second said position.

3. A speed control device for a motor-compressor unit, comprising a valve for controlling the speed of said motor, a regulator connected to the discharge of the compressor and having a member movable in response to variations in pressure of such discharge, linkage connected between the regulator and the valve for transmitting the movement of said member to said valve, a stop mechanism acting in one position to limit the movement of said member to limit the speed of the motor to its rated maximum, an energy accumulator connected to said stop and adapted to accumulate energy from said unit, means for supplying such energy to the accumulator whenever the load demand on the unit is below a predetermined value, such energy acting in co-operation with the regulator to actuate said stop into another position for increasing the limit of movement of said member such that the motor may exceed its rated maximum speed whenever the load demand on the compressor exceeds a predetermined value greater than the first said value, and means associated with said stop for dissipating such accumulated energy only when the stop is in its second said limiting position.

4. A speed control device for a motor and a fluid compressor driven thereby, comprising a valve for controlling the speed of the motor, a regulator connected to the compressor discharge and having a member therein movable in response to variations in pressure of such discharge, means for translating the movement of said member to the valve for varying the speed of the motor in accordance with such variations in pressure, a stop mechanism arranged to limit the range of movement of said member for limiting the speed range of the motor to its rated maximum, an accumulator connected to said stop and adapted to receive pressure fluid discharged from the compressor, a conduit connected to supply such pressure fluid to the accumulator, valve means for controlling the flow of fluid through said conduit, means for actuating said valve means whenever the load demand on the compressor falls below some predetermined value to permit the flow of pressure fluid to the accumulator, means for restricting the flow of such fluid into the accumulator, a piston in said stop mechanism exposed to the pressure of fluid from the accumulator, said piston being actuated by the regulator and such fluid whenever the load demand on the compressor exceeds a predetermined value higher than the first said value to move said stop for increasing the limit of speed range of the motor, said stop mechanism having an orifice therein for exhausting the pressure fluid from the accumulator only when the stop is actuated to increase the limit of speed range to permit the delayed return of the stop for reducing the motor speed to rated maximum.

5. A speed control device for a motor-compressor unit, comprising a regulator connected to said unit and responsive to variations in discharge pressure of the compressor for controlling the speed of the motor, a stop mechanism operatively associated with the regulator and acting in one position to limit the range of speed control of the motor, an energy accumulator connected to said stop mechanism and arranged to accumulate energy from the unit, means for supplying such energy to the accumulator whenever the load demand on the unit falls below a predetermined value, such accumulated energy acting in co-operation with the regulator to actuate the stop into a position to increase the range of speed control of said regulator whenever the sustained load demand on the unit exceeds some predetermined value greater than the first said value, and means for slowly releasing such energy only when the stop is actuated into the last said position.

6. A speed control device for a motor-compressor unit, comprising a valve connected to the motor for controlling the speed thereof, a regulator connected to the discharge of the compressor and having a member moving in response to variations in pressure of such discharge, means connected between the regulator and the valve for translating movement of such member to control the speed of the motor, a stop mechanism arranged to limit the movement of said member in one direction at the rated maximum speed of the motor, an accumulator connected to the unit for receiving energy therefrom and connected to said mechanism to supply energy thereto, such energy acting in co-operation with said member to actuate the stop mechanism into a second limiting position to permit a greater degree of movement of said member such that the speed of the motor may exceed the rated maximum, means connected between said unit and the accumulator for supplying energy thereto, a valve mechanism connected in the last said means for controlling the flow of energy therethrough and being actuated whenever the discharge pressure is above a predetermined maximum value to permit such flow and charge the accumulator, and means operatively associated with said stop mechanism for exhausting the energy from the accumulator only when the stop mechanism is in the second limiting position to return the stop mechanism to the first limiting position.

7. A speed control device for a motor and a compressor driven thereby, comprising a valve for controlling the speed of the motor, a regulator connected to the discharge of the compressor and having a member moving in response to variations in pressure of such discharge, linkage connected between the regulator and the valve arranged to be actuated by said member to control the speed of the motor, a stop mechanism arranged to limit the movement of said member in one direction at the rated maximum speed of the motor, an accumulator connected to the compressor discharge for receiving pressure fluid therefrom and connected to said mechanism to supply pressure fluid thereto, such pressure fluid acting in co-operation with said member to actuate the stop mechanism into a second limiting position to permit a greater degree of movement of said member such that the speed of the motor may exceed the rated maximum, means connected between said compressor discharge and the accumulator for supplying pressure fluid thereto, a valve mechanism connected in the last said means for controlling the flow of pressure fluid therethrough, means for actuating said valve mechanism whenever the compressor discharge pressure is above a predetermined maximum value to permit such flow and charge the accumulator, and a vent in said mechanism for exhausting the pressure fluid from the accumulator only when the stop mechanism is in the second limiting position.

8. A speed control device for a motor and a compressor driven thereby, comprising a valve for controlling the speed of the motor, a regulator connected to the discharge of the compressor and having a member movable in response to variations in pressure of such discharge, means connected between the regulator and the valve and actuated by movement of said member to set the valve for controlling the speed of the motor, a stop mechanism arranged to limit movement of said member at the rated maximum speed of the motor, said stop mechanism including a piston arranged to be urged in one direction by said member whenever the stop mechanism acts to limit movement of said member and a spring constantly urging the piston in the opposite direction, a tank connected to the compressor discharge for receiving pressure fluid therefrom and connected to said mechanism to supply pressure fluid to an end of the piston to urge the piston in said one direction, the strength of said spring being chosen such that the combined forces exerted on the piston by such pressure fluid and said member is sufficient to overcome the spring and move the stop into a second limiting position whenever the discharge pressure falls below a predetermined value to permit a greater degree of movement of said member such that the speed of the motor may exceed the rated maximum, a conduit connected between said compressor discharge and said tank for supplying pressure fluid thereto, and means for controlling the flow of pressure fluid through said conduit and being connected to be actuated to permit flow through said conduit only when the discharge pressure of the compressor exceeds a predetermined value higher than the first said value, and means controlled by movement of the piston into its second limiting position for releasing pressure fluid from the tank to cause a delayed return of said stop mechanism to its first limiting position to reduce the speed of the motor to its rated maximum.

9. A speed control device as claimed in claim 8 in which the last said means is in the form of a vent in said mechanism arranged such that it is uncovered by said piston in moving into its second limiting position to establish communication between the vent and the tank.

10. A speed control device as claimed in claim 8 in which the means for supplying pressure fluid to the tank includes an orifice member adapted to restrict the rate of flow of fluid into the tank.

References Cited in the file of this patent

UNITED STATES PATENTS

| | | |
|---|---|---|
| 2,166,789 | Baker | July 18, 1939 |
| 2,171,286 | Baker | Aug. 29, 1939 |
| 2,225,854 | Baker | Dec. 24, 1940 |
| 2,476,048 | Lamberton | July 12, 1949 |